US010982866B1

(12) United States Patent
Patel

(10) Patent No.: US 10,982,866 B1
(45) Date of Patent: Apr. 20, 2021

(54) GREEN CONDENSERLESS AIR CONDITIONER SYSTEM

(71) Applicant: Neville Patel, San Diego, CA (US)

(72) Inventor: Neville Patel, San Diego, CA (US)

( * ) Notice: Subject to any disclaimer, the term of this patent is extended or adjusted under 35 U.S.C. 154(b) by 210 days.

(21) Appl. No.: 16/010,586

(22) Filed: Jun. 18, 2018

(51) Int. Cl.
*F24F 5/00* (2006.01)
*F24F 3/14* (2006.01)
*F24F 13/28* (2006.01)

(52) U.S. Cl.
CPC .............. *F24F 5/0003* (2013.01); *F24F 3/14* (2013.01); *F24F 13/28* (2013.01); *F24F 2221/183* (2013.01)

(58) Field of Classification Search
CPC .. F24F 5/0003; F24F 3/14; F24F 13/28; F24F 2221/183; F24F 5/00; F24F 13/30; F24F 13/22; F25D 31/00; B60H 1/32
See application file for complete search history.

(56) References Cited

U.S. PATENT DOCUMENTS 2,894,376 A * 7/1959 Kelley ................... F24F 3/1417
 62/271
4,723,415 A * 2/1988 Chen ......................... F28D 5/00
 62/169
5,209,078 A * 5/1993 Conrad ................. B60H 1/3202
 137/62
2014/0338865 A1* 11/2014 Ross ...................... F24F 5/0035
 165/104.34

FOREIGN PATENT DOCUMENTS

WO    WO-2012002800 A2 *  1/2012  ............ F24F 5/0035

* cited by examiner

*Primary Examiner* — Frantz F Jules
*Assistant Examiner* — Martha Tadesse
(74) *Attorney, Agent, or Firm* — Coastal Patent Law Group, P.C.

(57) ABSTRACT

An air-conditioner system includes a vacuum chamber with a mist maker in communication with water to create mist within the vacuum chamber; a vacuum pump to maintain a vacuum within the vacuum chamber; a discharge outlet extending from the vacuum pump to discharge vapor; a nozzle attached to a water source; a circulating pump in fluid communication with the water within the vacuum chamber via an outlet; a cooling coil connected to the circulating pump to direct water from the circulating pump to the vacuum chamber; and an insulated chamber with a blower to blow cooled air to a building; the cooled air is cooled via the multi-row cooling coil positioned within the insulated chamber. Besides the cooling system, this invention integrates itself very well with the heating system as shown in schematics.

16 Claims, 5 Drawing Sheets

GREEN CONDENSERLESS AIR CONDITIONER SYSTEM

BACKGROUND

1. Field of the Invention

The present invention relates generally to air conditioning systems, and more specifically, to an air conditioning system without an air condenser that uses water as a refrigerant.

2. Description of Related Art

Air conditioner systems are well known in the art and are effective means to cool homes and buildings. Conventional air conditioner systems include an outdoor condenser that can be undesirable due to aesthetic reasons. Further, these outdoor condensers can cause undesirable noise and vibrations.

Accordingly, although great strides have been made in the area of air conditioning systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
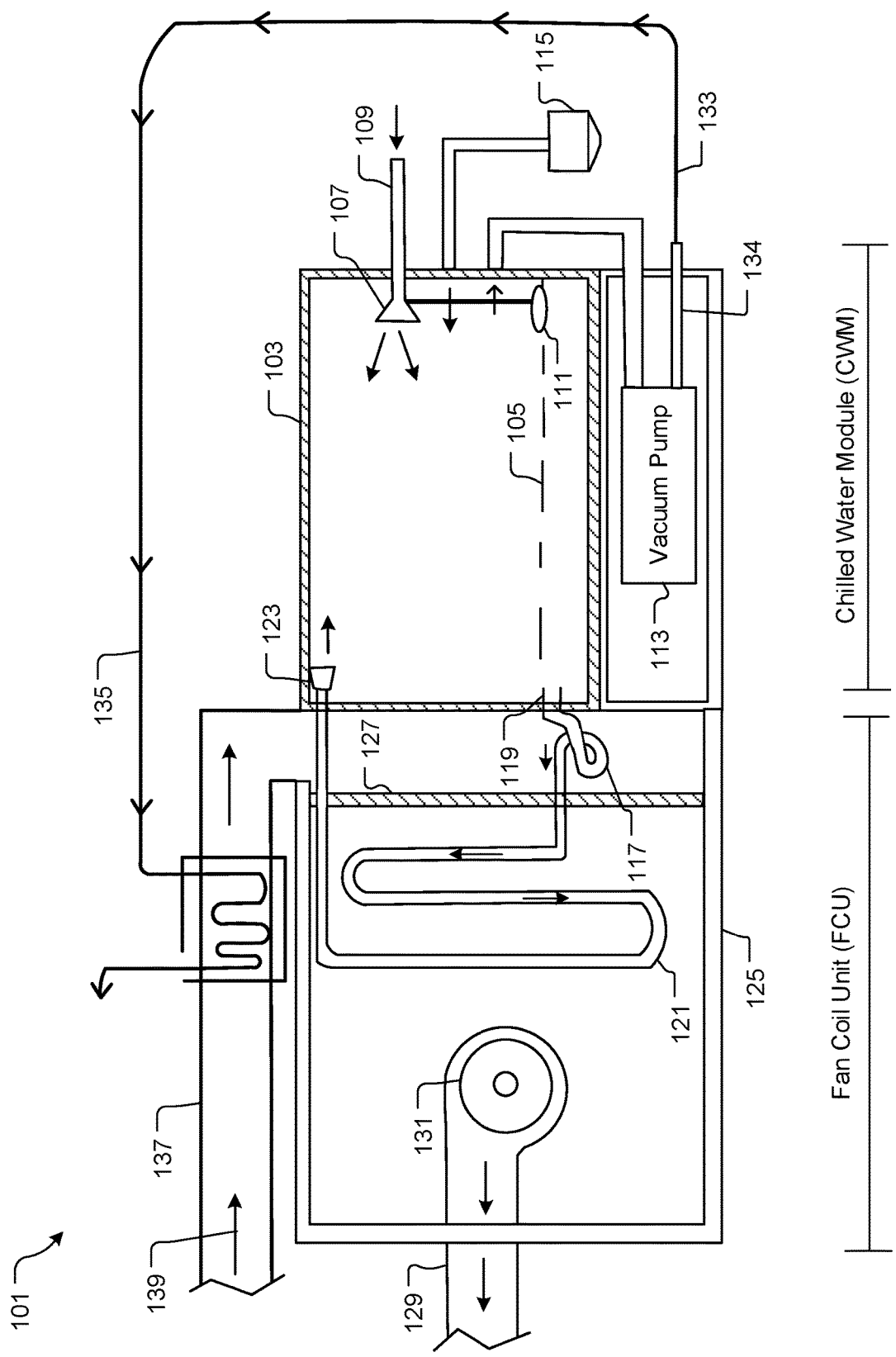
FIG. 1 is a simplified schematic of an air conditioner system in accordance with a preferred embodiment of the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional air conditioner systems. Specifically, the present application provides for an air conditioner system that does not require a condenser. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIG. 1 depicts a simplified schematic of an air conditioner system 101 in accordance with a preferred embodiment of the present application. It will be appreciated that system 101 overcomes one or more of the above-listed problems commonly associated with conventional air conditioner systems.

In the contemplated embodiment, the system 101 is depicted with a fan coil unit (FCU) and a chilled water module (CWM). It should be appreciated that the two units can be separable, thereby providing the advantage that the CWM can be placed in a convenient location, such as above a residential bathroom ceiling, and one or more FCU units can be located in ceilings of closets of each bedroom, or any other convenient configuration. The CWM is then connected to the one or more FCUs via insulated chilled water supply/return piping.

In the contemplated embodiment, system 101 includes a vacuum chamber 103 configured to receive and hold an amount of water 105 therein. Water 105 is input into chamber 103 via a nozzle 107 connected to a water source 109. In some embodiments, the nozzle 107 is connected to a float shut off mechanism 111 configured to shut the water off at a desired volume/height of the water. It should be appreciated that most of the chilled water is re-circulated (as will be discussed below), however, the makeup water (initial water) must come from the water source, in addition, the water source aids in re-supplying any water lost via steam/mist/vapor.

In the preferred embodiment a vacuum pump 113, with or without a diaphragm type vacuum pump, is configured to maintain the vacuum of chamber 103. It should be appreciated that one advantage of diaphragm type vacuum pump is there is no contamination of lubrication oil with the water vapor sucked thru the pump. Pump 113 can be either a single or multi stage pump, as desired. In the preferred embodiment, an ultrasonic mist maker 115 is in communication with chamber 103 and configured to produce a fine mist, which aids in rapid evaporation and the cooling process. The ultrasonic mist maker gets its supply of cold water thru water 105 from the CWM 103.

System 101 further includes a circulation pump 117 connected to an outlet 119 and further connected to a cooling coil 121 consisting of multi-row cooling coil, the cooling coil being housed inside an insulated chamber 125. The circulation pump 117 pulls water through from the vacuum chamber 103 and pushes it through the cooing coil 121 and back into the chamber 103 via a misting nozzle 123 (or any other appropriate nozzle), wherein the water is then reused by system 101.

In the preferred embodiment, the cooling coil 121, being positioned within insulated chamber 125, wherein air is pulled in, filtered via an air filter 127, and pushed out via a duct 129 and blower 131.

During use, the vacuum pump 113 creates a cooled vapor 133 which can be either discharged, or used for a pre-cooling module 135 (optional). The vapor 133 is pushed from a discharge 134, as shown, the vapor 133 can travel through an air flow chamber 135 to a conduit 137 to cool air 139 being pulled into the insulated chamber 125. This feature further improves the efficiency of the air conditioner system of the present invention.

Figure 1A:
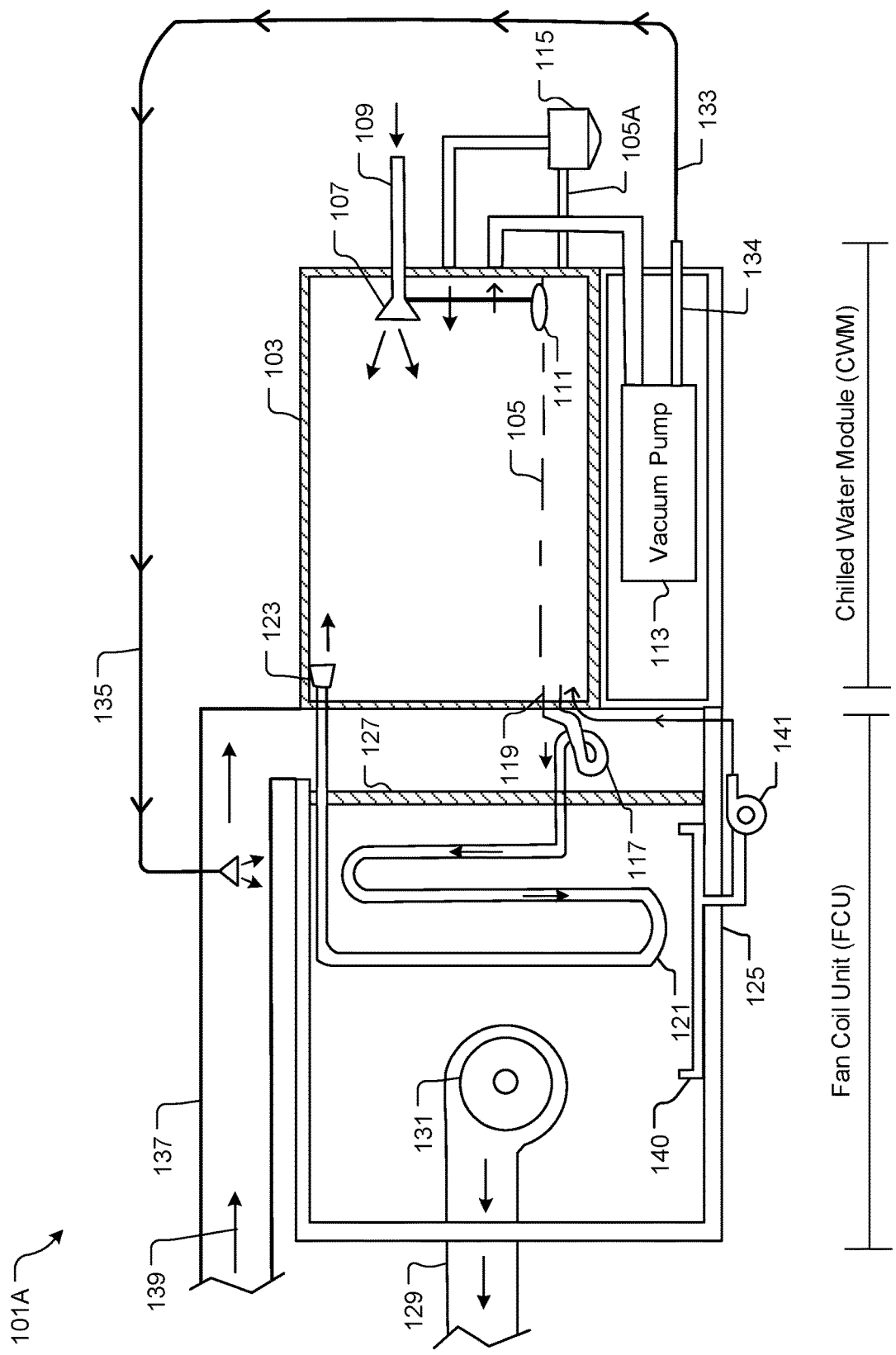
FIG. 1A is a simplified schematic of an alternative embodiment of an air conditioner system in accordance with the present application.

Referring to the Alternate Scheme, shown in system 101A in FIG. 1A, the cool vapor discharge from the vacuum pump is brought back and discharged directly into the return air from the space (instead of indirect heat exchanger of the pre-cooler module). This cool vapor mixing with return air will help in pre-cooling the air before entering into the FCU module 125. After the passing of air thru the filter 127 and the cooling coil 121, the moisture in the air will condense and drip down by gravity into the drain pan 140. This cooled condensate then will be pumped via circulation pump 141 back into the CWM module 103 in order to help replace any water lost during the evaporation process. This scheme will automatically replace the lost evaporated water from the CWM 103 thus minimizing any need for supplying any make up water from the city system. The pump 141 will cycle on and off in order to maintain desired water level in the CWM.

It should be appreciated that one of the unique features believed characteristic of the present application is the creation of a system that does not require an outdoor condenser. This feature improves efficiency and aesthetical appearance of an air conditioner system and also eliminates the noisy and vibrating condenser to minimize inconvenience to the neighbors.

Figure 2:
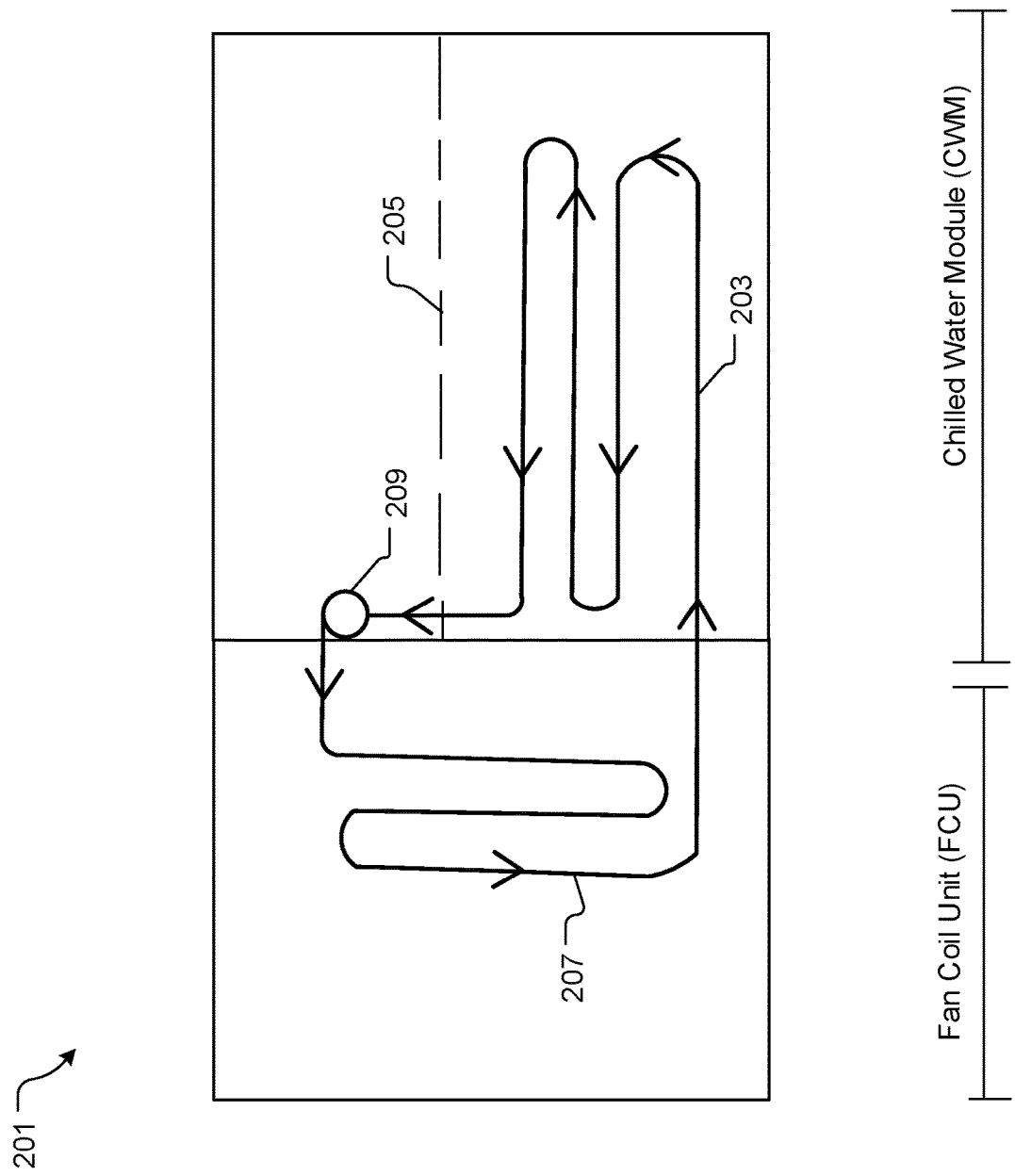
FIG. 2 is a simplified schematic of an alternative embodiment of an air conditioner system in accordance with the present application.

In FIG. 2, a simplified schematic of an alternative embodiment of an air conditioner system 201 in accordance with the present invention. System 201 includes all of the features and technology of system 101 and/or 101A. System 201 includes coil 203 in the CWM being completely submerged within the water 205 and connected to the cooling coil section 207 in the FCU via a recirculation pump in the FCU to create a closed-circuit water circulating system with the coils. The coils are filled with distilled water to prevent any mineral deposit within the coil, thus eliminating maintenance of the coil from inside. Again, it must be appreciated that all of the features of system 101 and/or 101A are incorporated into system 201.

Figure 3:
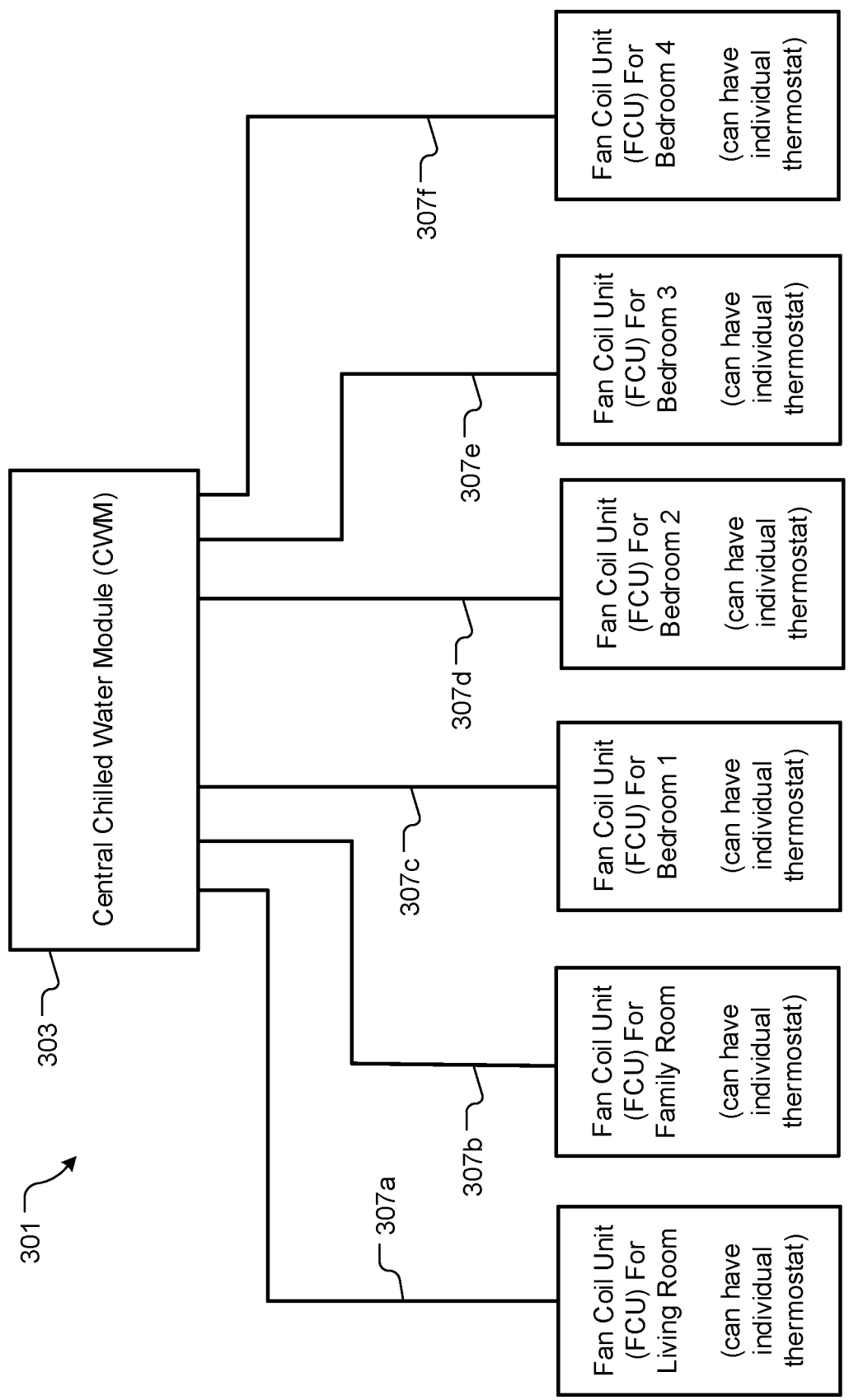
FIG. 3 is a simplified schematic of a household air conditioning system in accordance with the present invention.

In FIG. 3, a simplified schematic of a household air conditioning system 301 is shown, wherein a central chilled water module 303 (as previously explained and described) is in fluid communication with a single or plurality of fan coil units associated with the various rooms of the household via a plurality of insulated water pipes 307a-f. It should be appreciated that the Central CWM can be made larger to satisfy the cooling load of the entire household. In addition, it is contemplated and should be appreciated that each of the individual zones can be supplied with their own FCU and thermostat for custom comfort control. It should be appreciated that the insulated supply/return chilled water piping provides for a means to completely eliminate sheet metal ductwork which is expensive to fabricate, assemble, and install.

Figure 2A:
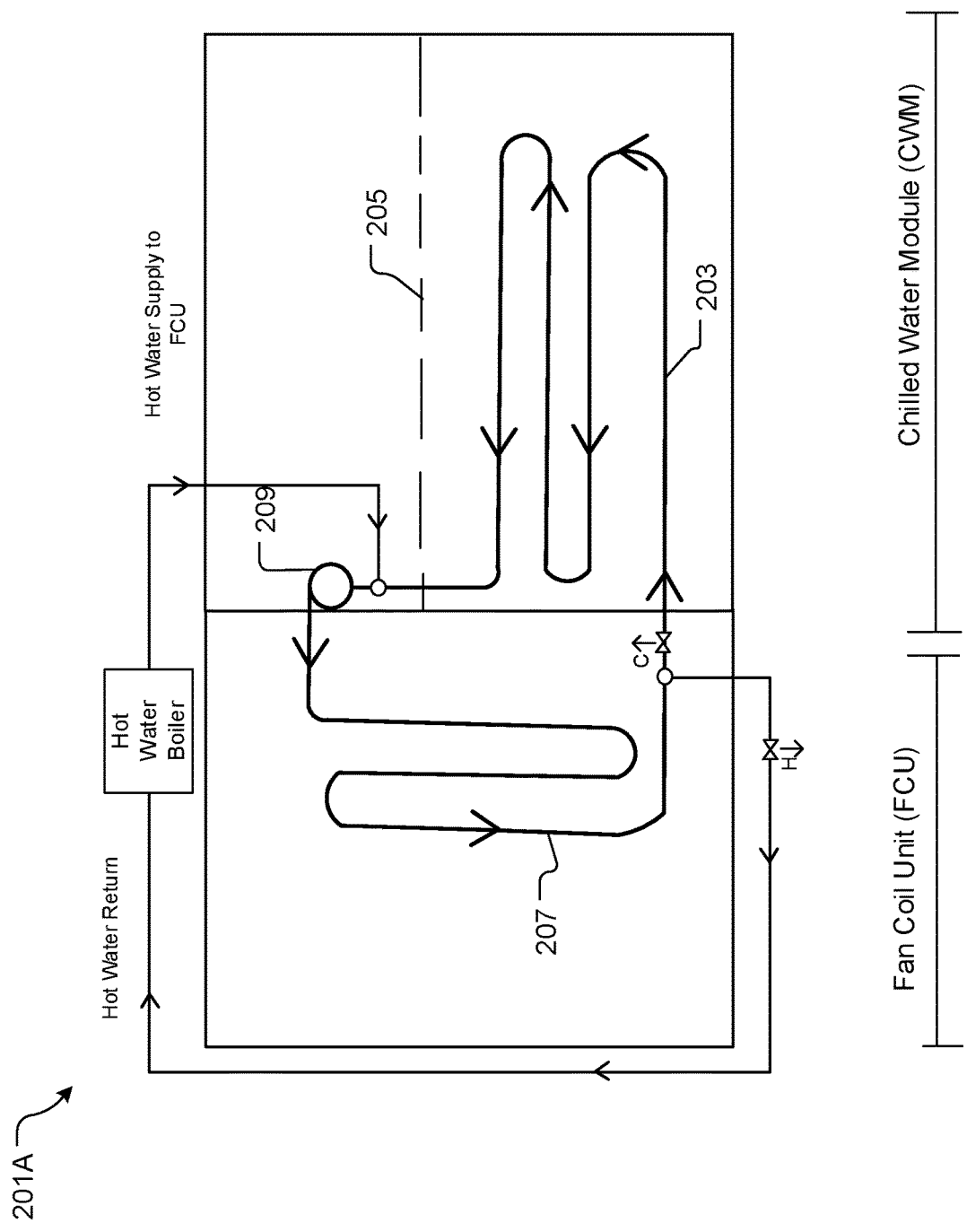
FIG. 2A is a simplified schematic of a heating and cooling system in accordance with the present application.

The following schematic depicted in FIG. 2A, system 201A, shall be appreciated to show how this invention can be integrated into both heating and cooling application of a residence or commercial purpose. For heating the space, a hot water boiler module is shown with hot water supply insulated piping connected to the circuit just before the system circulator 209. The returned hot water from the Fan Coil Unit module is supplied back into the boiler to be re-heated again. Two automatic solenoid control valves are added. The one in hot water circuit is labeled "H" and the one in the chilled water circuit is labeled "C". During the winter heating season, the boiler is fired up and supplies hot water to the FCU's, while the valve "H" remains in open position, allowing the hot water to circulate thru the coils in the FCUs and provide heated air into the space while the valve "C" is in closed position. During the summer cooling season, the CWM is activated by turning on the vacuum pump as described before and opening the chilled water valve "C" to allow chilled water to flow from the CWM module into the FCU module. The hot water circuit valve "H" will remain in closed position to prevent the chilled water from entering into the boiler. The same scheme will be repeated in multiple FCUs for an application requiring more than one zone for cooling and heating.

The following is a summary of the advantages of the present system over conventional air conditioning systems. The present invention provides for green technology, wherein no chemicals are used; the system does not require a noisy outdoor unit; the system is convenient for creating individual comfort zones, each with their own thermostat; and the design is simple which lends itself to efficient installation.

The system also eliminates all ductwork, thus saving considerable cost in ductwork installation and easy and quicker to install compared to conventional systems.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A condenserless air-conditioner system, comprising: a vacuum chamber configured to hold an amount of water, the vacuum chamber having a mist maker in fluidly coupled with the amount of water and configured to create mist within the vacuum chamber; a vacuum pump in fluidly coupled with the vacuum chamber and configured to maintain a vacuum within the vacuum chamber; a discharge outlet extending from the vacuum pump to discharge vapor; a nozzle configured to attach to a water supply and supply water from the water supply to an interior of the vacuum chamber; a circulating pump in fluidly coupled with the amount of water within the vacuum chamber via an outlet; a cooling coil connected to the circulating pump and configured to transfer water from the outlet of the vacuum chamber through the cooling coil and return the water to the vacuum chamber; and an insulated chamber with a blower configured to receive ambient air and blow cooled air to a building; further characterized in that the condenserless air conditioning system further comprises: a pre-cooler module, wherein the pre-cooler module is adapted as a heat exchanger; a conduit opening into the insulated chamber; an air flow chamber extending from the vacuum pump to the pre-cooler module and configured to direct vapor from the vacuum pump to the pre-cooler module for contacting the conduit and cooling the ambient air to form the cooled air; wherein the cooled air is further cooled via the cooling coil positioned within the insulated chamber.

2. The system of claim 1, further comprising: an air filter positioned within an interior of the insulated chamber.

3. The system of claim 1, further comprising: a float shut off in fluidly coupled with the nozzle and configured to shut off a make up water flow; wherein a float is used to maintain desired water level in the vacuum chamber.

4. The system of claim 1, further comprising: a submerged coil within the vacuum chamber and in fluidly coupled with the cooling coil via the circulating pump.

5. A condenserless air-conditioning system, comprising:
a conduit coupled to an insulated chamber and configured to cool ambient air; a vacuum chamber coupled to a cooling coil, each of the vacuum chamber and the cooling coil configured to circulate water therebetween, at least a portion of the cooling coil disposed within the insulated chamber; a vacuum pump coupled to the vacuum chamber at a first end and further coupled to a discharge outlet at a second end; and an air flow chamber extending from the discharge outlet and configured to pre-cool air passing though the conduit prior to said ambient air contacting the cooling coil.

6. The condenserless air conditioning system of claim 5, further comprising:
a drain pan disposed within the insulated chamber,
the drain pan is configured to receive condensed moisture; and
a circulation pump coupled to the drain pan;
wherein the circulation pump is configured to communicate the condensed moisture into the vacuum chamber.

7. The condenserless air conditioning system of claim 5, further comprising a pre-cooler module, the pre-cooler module coupled to the conduit, wherein the pre-cooler module is adapted as a heat exchanger for pre-cooling air passing though the conduit.

8. The condenserless air conditioning system of claim 5, further comprising an air filter disposed within the insulated chamber and positioned upstream from the cooling coil.

9. The condenserless air conditioning system of claim 5, wherein the air flow chamber is configured to communicate vapor from the discharge outlet to the conduit from mixing with the ambient air.

10. The condenserless air conditioning system of claim 9, wherein the vapor is allowed to directly mix with the ambient air inside the conduit.

11. A condenserless air-conditioner system, comprising: a vacuum chamber configured to hold water, the vacuum chamber having a mist maker in fluidly coupled with the water and configured to create mist within the vacuum chamber; a vacuum pump in fluidly coupled with the vacuum chamber and configured to maintain a vacuum within the vacuum chamber; a discharge outlet extending from the vacuum pump to discharge vapor; a nozzle configured to attach to a water supply and supply the water from the water supply to an interior of the vacuum chamber; a circulating pump in fluidly coupled with the water within the vacuum chamber via an outlet; a cooling coil connected to the circulating pump and configured to communicate the water from the outlet of the vacuum chamber through the cooling coil and return the water to the vacuum chamber via a misting nozzle; and an insulated chamber with a blower configured to receive ambient air and blow cooled air to a building; wherein the ambient air is cooled via the cooling coil positioned within the insulated chamber.

12. The condenserless air-conditioner system of claim 11 further comprising: a pre-cooler module, having: a conduit opening into the insulated chamber, wherein the pre-cooler module is adapted as a heat exchanger; and an air flow chamber extending from the vacuum pump to the conduit and configured to direct cool air from the vacuum pump to the conduit to cool the ambient air entering the insulated chamber.

13. The condenserless air-conditioner system of claim 11, further comprising: a float shut off in fluidly coupled with the nozzle and configured to shut off a make up water flow; wherein a float is used to maintain desired water level in the vacuum chamber.

14. The condenserless air-conditioner system of claim 11, further comprising: a submerged coil within the vacuum chamber and in fluidly coupled with the cooling coil via the circulating pump.

15. The condenserless air-conditioner system of claim 11, wherein cooled vapor is allowed to directly mix with air returning from the building.

16. The condenserless air-conditioner system of claim 11, further comprising; a drain pan; and a circulation pump: wherein the drain pan and the circulation pump is configured to collect and replace lost water from the system, thus minimizing a need for new water.

* * * * *